United States Patent [19]

Pedersen

[11] Patent Number: 4,645,557

[45] Date of Patent: Feb. 24, 1987

[54] METHOD OF ESTABLISHING SEALED PIPE LENGTHS OF PLASTIC PIPES BY JOINING OF PIPE ELEMENTS, PARTICULARLY DISTRICT HEATING PIPE LENGTHS

[76] Inventor: Hans N. Pedersen, Krogen 4, Haldrup, DK-8700 Horsens, Denmark

[21] Appl. No.: 666,310

[22] Filed: Oct. 30, 1984

Related U.S. Application Data

[63] Continuation of Ser. No. 476,864, Mar. 14, 1983, abandoned.

[51] Int. Cl.$^4$ .................. B32B 31/04; B32B 31/18
[52] U.S. Cl. .................... 156/250; 156/258; 156/293; 156/294; 156/304.2; 156/304.3; 156/304.6
[58] Field of Search .................. 156/77, 79, 250, 256, 156/258, 272.2, 275.1, 293, 294, 252, 304.2, 304.3, 304.6, 157, 158, 159; 285/47, 273

[56] References Cited

U.S. PATENT DOCUMENTS

| 2,583,396 | 1/1952 | Skoog ............................. 156/258 |
| 3,802,943 | 4/1974 | Prounce ........................ 156/583.1 |
| 3,949,461 | 4/1976 | Thastrup ......................... 285/47 |
| 4,090,899 | 5/1978 | Reich ............................. 156/79 |

Primary Examiner—Caleb Weston
Attorney, Agent, or Firm—Antonelli, Terry & Wands

[57] ABSTRACT

A method of joining plastic pipes by welding, whereby juxtaposed ends of the plastic pipes welded together along a peripheral annular welding zone presenting a discontinuous meeting area between continuous or uniform welding zone portions as extending to both sides of said meeting area.

7 Claims, 11 Drawing Figures

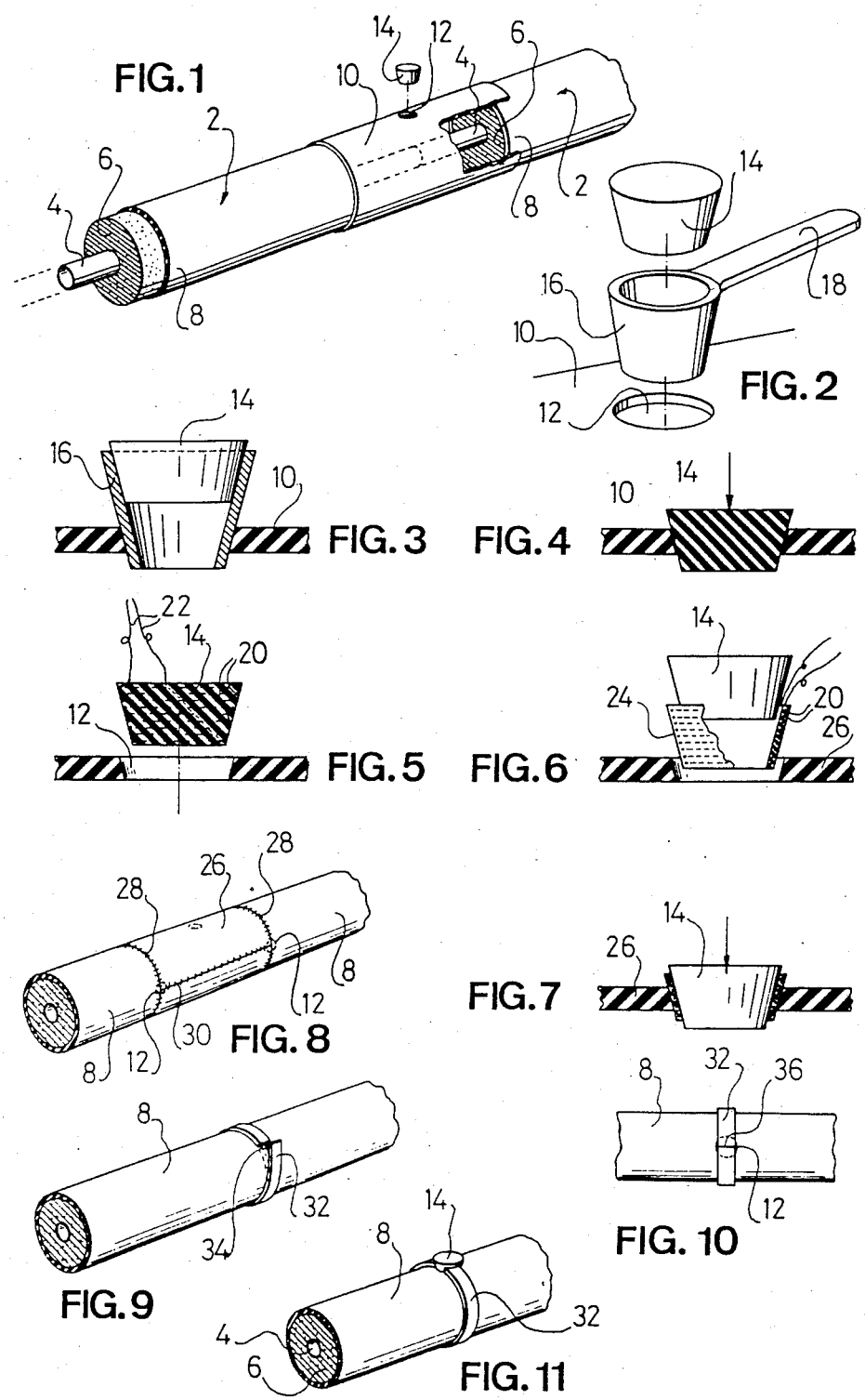

METHOD OF ESTABLISHING SEALED PIPE LENGTHS OF PLASTIC PIPES BY JOINING OF PIPE ELEMENTS, PARTICULARLY DISTRICT HEATING PIPE LENGTHS

This is a continuation of application Ser. No. 476,864 filed Mar. 14, 1982, abandoned.

The present invention relates to a method of establishing pipe lengths of plastic pipes by joining of prefabricated pipe elements, preferably heat insulated pipe elements having an outer mantle pipe of plastics, whereby by said joining it is desirable to utilize or provide such holes therein, which are later on closed in a fully sealed manner.

By the establishing of district heating pipe systems by means of prefabricated insulated pipe elements it is customary that the pipe elements are provided with one or two interior conductor pipes, which are endwise protruding from a surrounding insulation material and from the ends of an outer mantle pipe as surrounding the insulation material, and that the pipe elements are joined by welding together the respective conductor pipe ends and thereafter mounting an outer connector tube between the mantle pipe ends at the joint, whereafter the space inside the connector tube is filled with an insulating foam material as produced by pouring a foaming up liquid down through a hole in an upper wall portion of the connector tube. Upon the foaming up of the liquid the hole is to be closed absolutely tightly, such that intrusion of moisture from outside will be excluded through the following many years. The connector tube may consist of metal, but many times it is sufficient or desirable that it consists of plastics, and in such cases the connector tubes will constitute plastic pipe pieces which are to be joined to other plastic pipes, viz. the mantle pipes. As described below, by such joining of plastic pipes the desire as to provision and sealed closing of holes therein may have purposes other than enabling the introduction of a foam material; the basic problem will be the same, however, viz. that an existing or a provided hole in a wall portion of a plastic pipe is wanted to be closed in an entirely sealed manner.

On this background it is the purpose of the invention to provide a method of ensuring a really sealed closing of a hole in the wall of a plastic pipe. For this purpose, a stopper has been used, which by passive or active clamping in or into the hole has been able to close the hole, but according to the invention it is desirable to effect the closing by a real welding in of a stopper, because any better closing is hardly achievable when the welding is effectable in a really efficient manner. Thus, it is decisive for the invention that the closing of the hole shall take place by welding in of a stopper, which in practice, therefore, should consist of a weldable plastics material.

Now, parts of plastics may be welded together by various welding methods, e.g. by the welding in of a plastic strip in the joint area between the parts to be joined, and beforehand the invention is restricted to the use of a special and particularly effective welding method, viz. a so-called mirror welding, whereby the surfaces to be joined are formed or machined to fit each other exactly and are heated prior to or during the joining in such a manner that by the joining the surfaces will be subjected to a welding together without the use of extra welding material, the joint hereby being extended all along the adjoining surfaces as a whole and not only being active in a border area. Thereof, such as achieved by the welding in of a joining strip from the accessible side of the joint.

According to the invention care is taken that the hole in the wall of the plastic pipe appears as or is cut as a hole having an outwardly conically diverging wall shape, while a plastic stopper for closing the hole shows a correspondingly conical outer wall, and that immediately before or by the insertion of the stopper into the hole a welding heating of the relevant surface or surfaces is effectual.

Preferably this heating is effected by means of a special mirror welding hollow body tool, which is conical both on its interior and exterior side, and which is used, in a heated condition, to heat both the hole wall surface and the outer stopper surface. Alternatively, a fully usable surface heating is achievable by sending an electric current through one or more heating wires which are located on or embedded in the relevant surface, if desired with the use of a special stopper prepared accordingly.

Above it has been mentioned as an example that the hole in question is used for the filling in of a framing liquid, but in the discussed connection there will be other important fields of application of the invention. Thus, in case of welded joints of plastic pipes the method may be used for enabling a welding control, the hole then being provided across a welding seam and thereafter being closed upon inspection of the seam cross section. The hole may be provided in two stages, first by taking out a cylindrical bore probe for inspection and then by machining the hole conical prior to the closing thereof.

Another important application of the method according to the invention relates to the provision of a complete sealing of such a small pipe wall area which would otherwise be difficult to seal. This may be actual where a longitudinal welding seam in a welded-in connector skirt meets with the ajoining round going welding seams, or where a roundgoing welding is effected by means of a welding strip member, which may show a sealing problem adjacent its own intermeeting ends. Instead of seeking to fully weld together the material portions at such difficult welding areas it may be considerably easier just to drill out the relevant areas and close the resulting holes by a welding operation according to the invention.

In the following the invention is described in more detail with reference to the drawings, in which:

FIG. 1 is a perspective view of a pipe joint,

FIG. 2 is a perspective view illustrating the invention,

FIGS. 3 and 4 are associated sectional views illustrating the mounting of a stopper by mirror welding, FIGS. 5, 6 and 7 are corresponding sectional views of modified systems, FIG. 8 is a perspective view of an alternative pipe joint, and FIGS. 9–11 are views of another alternative pipe joint.

In FIG. 1 is shown a fully conventional joint between two district heating pipes generally designated by the reference numeral 2 having endwise projecting inner conductor pipes 4, which are welded together as a first stage of the joining work. The pipe ends 4 project from an insulation material 6 which is surrounded by an outer mantle tube 8 of a plastic material. Then a mantle connector tube 10 of plastics is pushed over the joint from a prelocated position about one of the mantle tube ends, and the connector tube 10 is shrunk, whereby it will be endwise tightened about the ends of the mantle tubes 8. Thereafter a foaming-up liquid is poured through an upper hole 12 in the connector tube 10, and the hole 12 is closed by a stopper 14 when the space inside the connector tube has become foam filled.

According to the invention the closing of the hole is effected by machining the hole wall into a conical shape and by using a correspondingly conical stopper 14 of a plastic material which is prepared by surface heating for insertion welding into the hole 12.

A Preferred heating method is illustrated in FIGS. 2 and 3. Use is made of a conical tube body 16 consisting of iron or another material which is well suited to give off heat energy, upon being heated, from its surfaces to the outside of the correspondingly conical stopper body 14 when the latter is placed as shown in FIG. 3 is placed inside the tube body 16 and to the edge surface of the hole 12 by insertion of the tube body therein, respectively. Preferably the hole 12 is provided by conical drilling or cutting such that its edge surface will in advance show the same conicity as the tube body 16, although smaller deviations in this respect may be corrected for by way of forcing the heated tube body 16 into the hole 12. The tube body may be heated to a well defined temperature in a suitably adapted heating apparatus (not shown), which is placed near the mounting site, and in practice it is possible to achieve a high quality welding when the tube body 16, with the use of the handle 18 as shown in FIG. 2, is rapidly moved from the heating apparatus to the position shown in FIG. 3, in which the inserted stopper 14 is forced more or less firmly against the tube surface, and when the parts are separated after a short, predetermined time interval and the stopper 14 is immediately thereafter forced into the hole 12 as illustrated in FIG. 4. If the relevant parts are prepared with smooth and regular surfaces it will be possible by this mirror welding technique to produce a first class welding under fully acceptable temperature and pressure affections of the plastic material.

It may be sufficient to effect a heating of only one of the surfaces to be joined.

When the stopper 14 is somewhat longer than the material thickness around the hole 12, then the diameter tolerances of the various parts will be uncritical because of their conical shape.

It will of course be possible to use welding tools corresponding to the tube body 16 and being directly provided or connected with heating means, which may ensure a well defined temperature of the tool in its position as shown in FIG. 3.

In FIG. 5 is shown an embodiment, in which the stopper 14 is provided with a built in electrical heating wire 20 extending through windings down along the outer stopper surface immediately adjacent or inside the surface and having outer connector wires 22, which are connectable to a current source for electrical heating of the outside of the stopper prior to or during the insertion of the stopper into the hole 12; in that case a surface- or mirror welding may be achieved without the use of any special mirror welding tool.

In the arrangement shown in FIGS. 6 and 7, a conical intermediate ring member 24, made of plastic material, is used and is provided with a heating wire just as the stopper in FIG. 5. It will be understood that this member 24 may, in a well controlled manner, be caused to get heated even to initial melting prior to or during the insertion of the stopper 14, whereby the ring body 24 will constitute a lasting welding tool in the joint (FIG. 7).

FIG. 8 shows that a connector tube consists of a sheet member 26, which has, by any suitable welding technique, been welded in between the ends of the mantle tubes 8, flush therewith along annular welds 28, e.g. according to our European Patent Application No. 80201208.8. Normally such a flushing welding in will require an additional longitudinal welding of at least one butt seam 30. At those places where the butt seam 30 abuts the side of the annular welds 28 problems may exist with respect to the attainment of a completely sealed welding, and according to the invention these problems may be overcome in an easy manner by drilling out the relevant local areas to form holes 12 as shown in dotted lines, whereafter these holes are closed by welding in stoppers as described above.

In FIG. 9 is shown a pipe joint, in which the abutting plastic tube ends are welded together by means of a separate welding strip 32, which is laid around the joining area 34 and is welded to the outer surfaces of the opposed mantle tube ends. The welding strip 32 will present its own joint 36, FIG. 10, and with usual welding techniques for the annular welding of the strip 32 this joint will not automatically be welded, i.e. the possibility of a leak will exist.

According to the invention, however, this undesirable possibility will be easily avoidable by machining or drilling out the joint area 36 to form a hole 12 as shown in dotted lines, whereafter this hole is effectively closed by means of a stopper 14 as shown in FIG. 11 and in accordance with the technique according to the invention. It will be unimportant that the welding strip is located on the outside of the mantle tube ends, since according to FIG. 11 a full welding contact will exist between the stopper 14 and the adjacent surfaces of both the mantle tubes and the opposed ends of the strip 32 when these ends are formed by the through-going drilling of the hole 12 (FIG. 10).

The term "welding" as used throughout this specification should not necessarily designate a heat welding, since it will be within the scope of the invention to make use of other welding methods, e.g. cold welding or gluing by means of suitable binding agents and suitable application methods therefore.

I claim:

1. A method of joining plastic pipes by welding, whereby juxtaposed ends of the plastic pipes are welded together along a peripheral annular welding zone presenting a discontinuous meeting area between continuous or uniform welding zone portions as extending to both sides of said meeting area, the method comprising the steps of drilling or cutting in the material of the pipe, in situ, an outwardly conical opening substantially covering the meeting area so as to expose effectively welded weld seam cross sections on a side of the opening, and closing the opening by a conical stopper of a plastic material by heating a conical outer peripheral portion thereof and forcing the conical stopper into the opening to thereby endwise seal each of said effectively welded weld seams individually as well as mutually.

2. A method according to claim 1, in which said discontinuous meeting area is represented by an area in which opposed ends of a welding strip laid around the joining area are located next to each other.

3. A method according to claim 2, in which the conical opening is drilled or cut through opposed welding strip ends such that these ends will thereafter present part-frustro conical surfaces with the conical opening as sharing generators with the conical opening in the pipe material.

4. A method of establishing a heat insulated, sealed pipe length of prefabricated pipe elements including at least one interior conductor pipe having a surrounding heat insulation and an outer mantle tube of plastic material, whereby the juxtaposed ends of the conductor pipe or pipes projecting from the corresponding ends of the mantle tubes are joined by welding, whereafter the adjacent ends of the mantle tube are interconnected by an axially split connector tube of a plastic, the opposed ends of which are welded along respective annular welding zones, to ends of the mantle tubes, while also the axial split of the connector tube is closed by welding along an axial welding zone, the opposed ends of which are located close to respective portions of the annular welding zones, in a meeting area therewith, the method comprising the steps of drilling or cutting in the pipe material, in situ, an outwardly conical opening substantially covering the meeting area so as to expose effectively welded seam cross sections on a side of the opening, and closing the opening by a conical stopper of a plastic material by heating a conical outer peripheral portion thereof and forcing the conical stopper into the opening to thereby endwise seal each of said effectively welded weld seams individually as well as mutually.

5. A method of establishing sealed pipe lengths of plastic pipes by joining prefabricated heat insulated pipe elements including at least one interior conductor pipe having a surrounding heat insulation and an outer mantle tube of plastic material, the method comprising the steps of welding juxtaposed outer mantle tubes so as to join the same together, said welding being effected along discontinuous welding seam areas so as to provide for at least one unwelded seam area, drilling or cutting, in situ, an outwardly conical opening in a meeting area of the discontinuous welding seam so as to expose effectively welded weld seam cross sections on a side of the opening, and closing the opening by a conical stopper of a plastic material by heating a conical outer peripheral portion thereof and forcing the conical stopper into the opening.

6. A method according to claim 5, wherein the welding seams are butt seams between adjacent wall portions of the outer mantle tube.

7. A method according to claim 5, wherein the welding seams are located at an outer surface of the outer mantle tube, between said outer surface and an outer welding strip means as welded to the outer surface, and wherein the conical stopper welded in the hole is also welded to edge surfaces of the welding strip means created by the hole drilling or cutting.

* * * * *